United States Patent
Lee et al.

(10) Patent No.: US 9,287,943 B2
(45) Date of Patent: Mar. 15, 2016

(54) METHOD AND APPARATUS FOR REDUCING PEAK-TO-AVERAGE POWER RATIO (PAPR) OF ORTHOGONAL FREQUENCY DIVISION MULTIPLEXING (OFDM) SIGNAL AND TRANSMITTER

(71) Applicant: Samsung Electronics Co., Ltd., Suwon-si (KR)

(72) Inventors: Byung Moo Lee, Seoul (KR); Byung Chang Kang, Yongin-si (KR); Jong Ho Bang, Suwon-si (KR); Nam Jeong Lee, Yongin-si (KR); Jin Hyeock Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 14/160,818

(22) Filed: Jan. 22, 2014

(65) Prior Publication Data
US 2014/0348254 A1    Nov. 27, 2014

(30) Foreign Application Priority Data
May 24, 2013 (KR) .................. 10-2013-0059201

(51) Int. Cl.
| H04B 7/02 | (2006.01) |
| H04L 1/02 | (2006.01) |
| H04B 7/04 | (2006.01) |
| H04L 5/00 | (2006.01) |

(52) U.S. Cl.
CPC ............ *H04B 7/0426* (2013.01); *H04B 7/0452* (2013.01); *H04L 5/0007* (2013.01)

(58) Field of Classification Search
CPC ... H04B 7/0426; H04B 7/0452; H04L 5/0007
USPC ....................................... 375/267
See application file for complete search history.

(56) References Cited

U.S. PATENT DOCUMENTS

| 8,503,291 B1* | 8/2013 | Lee et al. ........................ 370/225 |
| 2008/0137767 A1 | 6/2008 | Jaenecke |
| 2008/0285432 A1* | 11/2008 | Ueng et al. .................... 370/203 |
| 2008/0298316 A1 | 12/2008 | Bitran et al. |
| 2009/0092195 A1 | 4/2009 | Guo et al. |
| 2009/0129257 A1* | 5/2009 | Maltsev et al. ............... 370/208 |
| 2010/0177847 A1 | 7/2010 | Woodward |
| 2012/0269301 A1 | 10/2012 | Miyanaga et al. |
| 2013/0028160 A1* | 1/2013 | Lee et al. ........................ 370/311 |
| 2013/0242930 A1* | 9/2013 | Takahashi et al. ............ 370/329 |
| 2013/0265973 A1* | 10/2013 | Nakamura et al. ............ 370/329 |

FOREIGN PATENT DOCUMENTS

| JP | 2012-114723 | 6/2012 |
| KR | 10-2007-0065984 | 6/2007 |
| KR | 10-2009-0033703 | 4/2009 |
| KR | 10-2011-0012322 | 2/2011 |

OTHER PUBLICATIONS

Shang-Kang Deng; Mao-Chao Lin; "Recursive Clipping and Filtering with Bounded Distortion for PAPR Reduction," IEEE Transactions on Communications, Year: 2007, vol. 55, Issue: 1, pp. 227-230.*

* cited by examiner

*Primary Examiner* — Nader Bolourchi
(74) *Attorney, Agent, or Firm* — NSIP Law

(57) ABSTRACT

Methods and apparatus for reducing a peak-to-average power ratio (PAPR) of an orthogonal frequency division multiplexing (OFDM) signal in an MIMO-OFDM communication system is provided, in which the method for reducing the PAPR of the OFDM signal may identify interference generated in an MIMO communication system, and adjust a clipping ratio (CR) for an effect of a clipping distortion to be less than an effect of interference.

18 Claims, 12 Drawing Sheets

METHOD AND APPARATUS FOR REDUCING PEAK-TO-AVERAGE POWER RATIO (PAPR) OF ORTHOGONAL FREQUENCY DIVISION MULTIPLEXING (OFDM) SIGNAL AND TRANSMITTER

CROSS-REFERENCE TO RELATED APPLICATION

This application claims the benefit under 35 USC §119(a) of Korean Patent Application No. 10-2013-0059201, filed on May 24, 2013, in the Korean Intellectual Property Office, the entire disclosure of which is incorporated herein by reference for all purposes.

BACKGROUND

1. Field

The following description relates to a method for reducing a peak-to-average power ratio (PAPR) of an orthogonal frequency division multiplexing (OFDM) signal in a multiple-input multiple-output (MIMO)-OFDM communication system.

2. Description of Related Art

A MIMO communication system may have a high efficiency through use of a plurality of antennas for a transmitter or a receiver. In recent times, the MIMO communication system uses a scheme of enhancing spectral efficiency and energy efficiency simultaneously, through installing as many transmission antennas as possible. A MIMO-OFDM communication system in which an OFDM scheme is applied to the MIMO communication system is newly introduced to reduce interference between symbols, and achieve robustness in a frequency selective fading channel. For the MIMO-OFDM communication system, energy efficiency of a power amplifier (PA) as a radio frequency (RF) to be provided in a plurality of antennas may affect a system performance. The OFDM communication system may be faced with an issue of non-linear distortion, power efficiency deterioration, and the like, in a high power amplifier (HPA) due to a high PAPR.

A clipping scheme may be used to reduce the high PAPR of the OFDM communication system. The clipping scheme may refer to a scheme for clipping a signal when the signal on a time domain exceeds a predetermined threshold. When a signal is clipped, efficiency of the PAPR may be enhanced, however, an overall performance of the OFDM communication system may be degraded due to a clipping distortion.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method for reducing a peak-to-average power ratio (PAPR) of an orthogonal frequency division multiplexing (OFDM) signal in a multiple-input multiple-output (MIMO) communication system, the method including estimating an interference level in a communication channel between a transmitter and a user terminal; determining a clipping ratio (CR), based on the estimated interference level; clipping an OFDM signal based on the determined CR; and filtering the clipped OFDM signal.

The determining of the CR may include determining the CR to reduce a power of a clipping distortion to be less than a power of the interference level.

The determining of the CR may include determining the CR based on at least one of an inter-cell interference level, an inter-carrier interference (ICI) level, an inter-user interference (IUI) level, or a result of calculating a sum of the IUI level, the inter-cell interference level, and the ICI level.

The determining of the CR may include determining the CR based on at least one of a number of transmission antennas, a number of user terminals, or a communication bandwidth.

The estimating of the interference level may include determining whether the MIMO communication system performs a matched filtering (MF) precoding; and estimating an IUI level, based on a cross correlation level of a channel in response to the MIMO communication system performing matched filter (MF) precoding.

The estimating of the interference level may include estimating at least one of an inter-carrier interference (ICI) or inter-cell interference in response to the MIMO communication system not performing matched filter (MF) precoding.

The determining of the CR may include determining the CR, based on an energy efficiency and an error vector magnitude (EVM) of the MIMO communication system.

The clipping and filtering of the OFDM signal may include clipping and filtering an OFDM signal repeatedly in a predetermined range.

The method may include estimating a communication channel between a transmitter and a user terminal for configuring the MIMO communication system.

The estimating of the interference level may include determining the interference level based on at least one of a number of transmission antennas, a number of user terminals, or a communication bandwidth.

In another general aspect, there is provided a multiple-input multiple-output (MIMO) apparatus including an interference level estimator configured to estimate an interference level in a communication channel between a transmitter and a user terminal; a clipping ratio (CR) determiner configured to determine a CR to be applied to an orthogonal frequency division multiplexing (OFDM) signal, based on the interference level; a clipper and filter configured to clip the OFDM signal based on the CR and filter the clipped OFDM signal; and a transmitter configured to transmit the clipped and filtered OFDM signal to the user terminal.

The CR determiner may be configured to determine a CR, based on at least one of an inter-user interference (IUI) level, an inter-cell interference level, an inter-carrier interference (ICI) level, or a result of calculating a sum of the IUI level, the inter-cell interference level, and the ICI level.

In another general aspect, there is provided an apparatus for reducing a peak-to-average power ratio (PAPR) of an orthogonal frequency division multiplexing (OFDM) signal, the apparatus including a channel estimator configured to estimate a communication channel between a transmitter and a user terminal in a multiple-input multiple-output (MIMO) communication system; an interference level estimator configured to estimate an interference level in the communication channel; and a clipping ratio (CR) determiner configured to determine a CR, based on the interference level, and to provide the determined CR to the transmitter.

The CR determiner may be configured to determine a CR to reduce a power of a clipping distortion to be less than a power of the interference level.

The CR determiner may be configured to determine a CR based on at least one of an inter-user interference (IUI) level, an inter-cell interference level, an inter-carrier interference (ICI) level, or a result of calculating a sum of the IUI level, the inter-cell interference level, and the ICI level.

The CR determiner is configured to determine a CR based on at least one of a number of transmission antennas, a number of user terminals, or a communication bandwidth.

The CR determiner may be configured to determine a CR based on an energy efficiency and an error vector magnitude (EVM) of the MIMO communication system.

The channel estimator may be configured to estimate the IUI level, based on a cross correlation level of a channel when the MIMO communication system performs precoding using a matched filter (MF).

The channel estimator may be configured to estimate the communication channel based on at least one of an uplink pilot signal provided by a terminal or channel sounding.

The CR determiner may be configured to increase the CR when energy efficiency of a power amplifier takes precedence over a clipping distortion; and reduce the CR when maintaining an original signal takes precedence over the energy efficiency of the power amplifier.

Other features and aspects will be apparent from the following detailed description, the drawings, and the claims.

Figure 1:
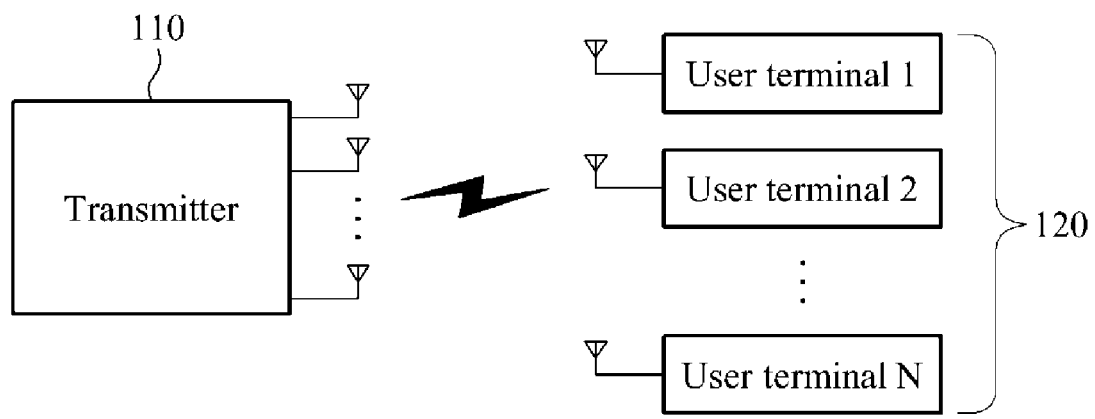
FIG. 1 is a diagram illustrating an example of a multiple-input multiple-output-orthogonal frequency division multiplexing (MIMO-OFDM) communication system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a multiple-input multiple-output-orthogonal frequency division multiplexing (MIMO-OFDM) communication system. The MIMO-OFDM communication system may include a transmitter 110 for transmitting an OFDM signal to a plurality of user terminals 120 and the plurality of user terminals 120 for receiving the OFDM signal. The transmitter 110 may use a plurality of transmission antennas to transmit the OFDM signal to the plurality of user terminals 120. The transmitter 110 may transmit the OFDM signal, using a portion or all of the transmission antennas. The transmitter 110 may perform precoding on a signal to be transmitted in order to reduce interference among the plurality of user terminals 120.

To reduce a peak-to-average power ratio (PAPR) of the OFDM signal, the transmitter 110 may perform clipping for the plurality of transmission antennas. The transmitter 110 may clip an OFDM signal greater than a predetermined level. In a non-exhaustive example, the transmitter 110 may determine a clipping ratio (CR) of the OFDM signal, based on an interference level of the MIMO-OFDM communication system. The CR may represent a degree of an OFDM signal to be clipped. The transmitter 110 may adjust the CR for an effect of clipping distortion to be less than an effect of interference. When the transmitter 110 determines the CR, the transmitter 110 may enhance efficiency of a power amplifier (PA) while reducing the PAPR, based on the interference level of the MIMO-OFDM communication system.

The transmitter 110 may clip the OFDM signal based on the CR, and filter the clipped OFDM signal. The transmitter 110 may transmit the clipped and filtered OFDM signal to the plurality of user terminals 120.

Figure 2:
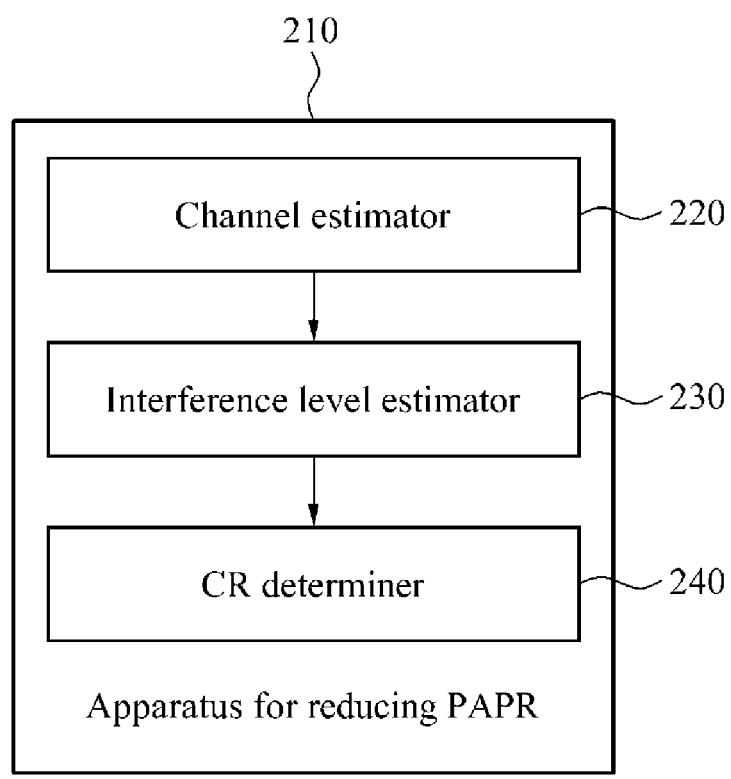
FIG. 2 is a diagram illustrating an example of a detailed configuration of an apparatus for reducing a peak-to-average power ratio (PAPR).

FIG. 2 illustrates an example of a detailed configuration of an apparatus 210 for reducing a PAPR. Referring to FIG. 2, the apparatus 210 for reducing the PAPR may include a channel estimator 220, an interference level estimator 230, and a CR determiner 240. The apparatus 210 for reducing the PAPR may be built inside or outside a transmitter.

The channel estimator 220 may estimate a communication channel between a transmitter and a user terminal in an MIMO communication system. For example, in a non-exhaustive example, when the MIMO communication system uses a time division duplex (TDD) scheme, the channel estimator 220 may identify channel information through an uplink pilot signal provided from the user terminal, channel sounding, and the like. The channel estimator 220 may estimate the communication channel between the transmitter and the user terminal, based on the identified channel information. In another non-exhaustive example, when the MIMO communication system uses a frequency division duplex (FDD) scheme, a channel reciprocity may not be realized unlike an instance of the TDD scheme, and the channel estimator 220 may be provided with channel information directly from the user terminal. The channel estimator 220 may estimate a communication channel between the transmitter and the user terminal, using the channel information provided from the user terminal.

The interference level estimator 230 may estimate an interference level from the communication channel. The interference level estimator 230 may identify a precoding scheme of the MIMO communication system, and determine whether use of the MIMO communication system for interference may be possible. For example, the interference level estimator 230 may determine whether the MIMO communication system performs precoding using a matched filter (MF). When the MIMO communication system performs precoding, using the MF, the interference level estimator 230 may estimate a cross correlation level of a channel. The interference level estimator 230 may estimate an interference level in a communication channel from the cross correlation level of the channel. The interference level estimator 230 may verify inter-user interference (IUI), and estimate an interference level of the IUI. The interference level estimator 230 may estimate an interference level, based on a system parameter including at least one of a number of transmission antennas, a number of user terminals, or a communication bandwidth.

The interference level estimator 230 may estimate an interference level of interferences other than IUI. For example, the interference level estimator 230 may estimate inter-cell interference generated by a signal transmitted from an adjacent cell, or inter-carrier interference (ICI) generated by an overlap between adjacent carriers, frequency offset, phase noise, and the like.

The CR determiner 240 may determine a CR, based on the estimated interference level, and provide the determined CR to the transmitter. For example, the CR determiner 240 may determine a CR that reduces a power of a clipping distortion to be less than a power of an interference level. The CR determiner 240 may determine a CR for an effect of the clipping distortion to be less than the effect of the interference, and enhance efficiency of a PA, without affecting a performance of the MIMO communication system due to the clipping.

The CR determiner 240 may determine a CR, based on energy efficiency of a communication system and a clipping distortion of an OFDM signal generated by clipping. For example, the CR determiner 240 may increase a CR of the OFDM signal when energy efficiency of the PA takes precedence over the clipping distortion of the OFDM signal. The CR determiner 240 may reduce the CR of the OFDM signal when maintaining an original signal takes precedence over the energy efficiency of the PA. As the CR increases, the clipping distortion of the OFDM signal may increase, however, the energy efficiency of the PA may be enhanced.

The CR determiner 240 may adaptively determine a CR, based on conditions of a channel. The CR determiner 240 may determine the CR, based on at least one of an IUI level, an inter-cell interference level, or an inter-carrier interference (ICI) level. The CR determiner 240 may determine a CR, using any one of interference levels from among the IUI level, the inter-cell interference level, the ICI level, or using a plurality of interference levels from among the IUI level, the inter-cell interference level, and the ICI level. For example, the CR determiner 240 may determine a CR, based on a result of calculating a sum of the IUI level, the inter-cell interference level, and the ICI level.

The CR determiner 240 may adaptively determine a CR, based on a system parameter including at least one of a number of transmission antennas, a number of user terminals, or a communication bandwidth. The number of transmission antennas and the number of user terminals used by a transmitter may vary over time, and a performance of the MIMO communication system may differ based on the number of transmission antennas and the number of user terminals. For example, the CR determiner 240 may adaptively adjust a CR, based on a variable interference level because the interference level of a communication channel may vary based on the number of transmission antennas and user terminals currently being operated.

The CR determiner 240 may determine a CR, based on energy efficiency of the MIMO communication system and an error vector magnitude (EVM). The EVM may refer to an estimation parameter indicating a modulation quality of a signal modulated within a predetermined spectrum band. The EVM may indicate a degree of similarity between an original OFDM signal and an OFDM signal on which clipping is performed. The higher the CR, the energy efficiency of the MIMO communication system may be greater, but the EVM may be lesser. The EVM for maintaining a modulation quality to be greater than a predetermined degree may exist, and the CR determiner 240 may determine a CR within a range in which the modulation quality is maintained to be greater than the predetermined degree, and a range in which a predetermined EVM is satisfied. The CR determiner 240 may determine a CR within a range in which a modulation quality is maintained to be in greater than a predetermined degree, and a range in which energy efficiency in greater than a predetermined degree is satisfied.

A process in which the apparatus 210 for reducing the PAPR determines a CR will be discussed with reference to Equations 1 to 20. In the MIMO-OFDM communication system, simultaneously supporting a plurality of user terminals, a transmitter including an Nt number of transmission antennas and a K number of user terminals including single reception antennas, respectively, are assumed to be a number of an MIMO communication system being represented by "Nt×K". Nt is assumed to be greater than K, in general. $X_t=[X_t[0], X_t[1], \ldots, X_t[N-1]]^T$ is assumed to be an OFDM signal of a frequency domain of a t-th transmission antenna. The OFDM signal of a time domain may be represented by Equation 1.

$$x_t = F_N^H X_t, t=1,\ldots,N_t \quad \text{[Equation 1]}$$

Here, $F_N^H$ denotes an N point inverse fast fourier transform (IFFT) matrix, and may be expressed as Equation 2.

$$F_{n,k} = \frac{1}{\sqrt{N}} e^{-j2\pi nk/N}, 0 \leq n, k \leq N-1 \quad \text{[Equation 2]}$$

A PAPR of the OFDM signal may be defined by Equation 3.

$$PAPR = \frac{LN \cdot \|x_t^o\|_\infty^2}{E[\|x_t^o\|_2^2]} \quad \text{[Equation 3]}$$

Here, $x_t^o$ denotes an oversampling version of $x_t$, and L denotes an oversampling factor. A process of reducing the PAPR of the OFDM signal may generally be performed in a digital domain whereas an actual effect of the PAPR may be realized in an analog domain. The apparatus 210 for reducing the PAPR may perform oversampling to approximately match the PAPR in the digital domain and the PAPR in the analog domain. $\|x_t^o\|_\infty$ and $\|x_t^o\|_2$ denote an $l_\infty$ norm and an $l_2$ norm, respectively.

A clipping process of reducing the PAPR may be performed for a plurality of transmission antennas. The clipping process may be given by Equation 4.

$$\hat{x}_t(n) = \begin{cases} x_t(n), & |x_t(n)| \leq A_{max} \\ A_{max} e^{j\theta_n}, & |x_t(n)| > A_{max} \end{cases} \quad \text{[Equation 4]}$$

Here, $A_{max}$ denotes a maximum allowable signal amplitude, or a maximum amplitude subsequent to being clipped, and $\theta_n$ denotes a phase of the OFDM signal.

A CR representing a degree of clipping may be given by Equation 5.

$$CR = \frac{A_{max}}{\sqrt{P_{in}}} \quad \text{[Equation 5]}$$

$P_{in}$ denotes an average power of the OFDM signal, prior to being clipped.

When the OFDM signal is assumed to have a sufficient cyclic prefix, and inhibit a multipath effect of a communication channel, a k-th received OFDM signal of a frequency domain may be calculated according to Equation 6.

$$Y[k] = \sqrt{P_{tx}} H[k] X[k] + N[k] \quad \text{[Equation 6]}$$

Here, Y[k] denotes a reception signal vector of K×1 for a plurality of user terminals, and $P_{tx}$ denotes a forward link total transmission (Tx) power. H[k] denotes a Rayleigh fading channel matrix of K×$N_t$ between an Nt number of transmission antennas and a K number of user terminals.

X[k] denotes a transmission signal vector of $N_t$×1, and N[k] denotes an additive white Gaussian noise (AWGN) vector of K×1.

When a communication system in which an Nt number of transmission antennas of a transmitter is greater than a K number of antennas of a receiver is assumed, mapping a K number of message signals to the Nt number of transmission antennas may be required. To this end, a pre-treatment process of precoding may be performed. Precoding may be performed in a direction in which a signal to interference-plus-noise ratio (SINR) of a receiver is increased to a maximum. When a number of transmission antennas of the transmitter is greater than a number of reception antennas of the receiver, a matched filtering (MF) precoding may be concise and efficient.

A transmission signal X may be defined by Equation 7.

$$X = \zeta W S \quad \text{[Equation 7]}$$

Here, S denotes a message signal vector of K×1, and $\zeta$ denotes a Tx power normalization factor of a transmission power, and may be approximated and represented by Equation 8.

$$\zeta \approx \sqrt{\frac{N_t}{K}} \quad \text{[Equation 8]}$$

W denotes a precoding matrix of $N_t$×K, and the MF precoding matrix may be simplified as Equation 9.

$$W = N_t^{-1} H^H \quad \text{[Equation 9]}$$

A clipping process may be performed individually for a plurality of antennas. The clipped OFDM signal in a time domain may be calculated according to Equation 10.

$$\hat{x}_t(n) = \alpha_t x_t(n) + d_t(n), 0 \leq n \leq N-1 \quad \text{[Equation 10]}$$

Here, $\alpha_t$ denotes an attenuation factor, and $d_t(n)$ denotes in-band clipping noise.

A spectral leakage is assumed to be removed through performing filtering subsequent to clipping The attenuation factor $\alpha_t$ may be expressed by Equation 11.

$$\alpha_t = \frac{E[x_t(n)\hat{x}_t(n)]}{E[x_t(n)x_t(n)]} = 1 - e^{-v^2} + \frac{\sqrt{\pi}\, v}{2} \text{erfc}(v) \quad \text{[Equation 11]}$$

Here, v denotes a CR, and E[x] denotes an expectation value or an average value of "x".

Clipping noise in a frequency domain may be given by Equation 12.

$$D_t[k] = \frac{1}{\sqrt{N}} \sum_{n=0}^{N-1} d_t(n) e^{-j2\pi nk/N} \quad \text{[Equation 12]}$$

A clipped signal $\hat{X}_t[k]$ in the frequency domain may be provided in a form in which a message signal $S_l[k]$, l=1, 2, ..., K and a clipping distortion generated in the frequency domain are combined, and may be represented by Equation 13.

$$\hat{X}_t[k] = \alpha_t \sum_{l=1}^{K} W_{t,l}[k] S_l[k] + D_t[k] \quad \text{[Equation 13]}$$

The attenuation factor $\alpha_t$ may be compensated based on Equation 11.

When $\alpha_t$ is assumed to be compensated for, an OFDM signal received by an i-th user terminal may be represented by Equation 14.

$$Y_i[k] = \sqrt{\frac{P_{tx} N_t}{K}} H_{i,:}[k] W_{:,i}[k] S_i[k] + \\ \sqrt{\frac{P_{tx} N_t}{K}} \sum_{l \neq i} H_{i,:}[k] W_{:,l}[k] S_l[k] + \\ \sqrt{\frac{P_{tx} N_t}{K}} H_{i,:}[k] D[k] + N_i[k] \quad \text{[Equation 14]}$$

Here, $H_{i,:}[k]$ denotes a k-th subcarrier 1×$N_t$ channel vector of the i-th user terminal, and $W_{:,i}[k]$ denotes a $N_t$×1 precoding vector. $S_i$ denotes a message signal, D[k] denotes a $N_t$×1 distortion vector, and $N_i[k]$ denotes an AWGN.

An effective SINR $\gamma_k$ may be defined by Equation 15, based on Equation 14.

$$\gamma_k[k] = \frac{\frac{P_{tx}N_t}{K}|H_{i,:}[k]W_{:,i}[k]|^2}{\frac{P_{tx}N_t}{K}\left[\frac{|\sum_{l\neq k} H_{i,:}[k]W_{:,l}[k]|^2 +}{|H_{i,:}[k]]D[k]|^2}\right] + N_0B} \quad \text{[Equation 15]}$$

In the MIMO communication system, a clipping distortion may be reduced using IUI, and the clipping distortion may be less than the IUI to enhance energy efficiency of the MIMO communication system. In a non-exhaustive example, the clipping distortion may be considerably lesser than the IUI, as necessary.

An instance in which the clipping distortion is required to be substantially less than the IUI may be given by Equation 16.

$$|H_{i,:}[k]D[k]|^2 << |\sum_{l\neq k} H_{i,:}[k]W_{:,l}[k]|^2 \quad \text{[Equation 16]}$$

Equation 16 may be simplified by Equation 17 because a channel response and the clipping distortion may be independent of one another.

$$E[|D[k]|^2] << E\left[|\sum_{l\neq k} H_{i,:}[k]W_{:,l}[k]|^2\right] \quad \text{[Equation 17]}$$

When MF precoding is performed, Equation 17 may be expressed as Equation 18, and limiting conditions such as Equation 19 may be added with respect to the clipping distortion.

$$E[|D[k]|^2] << E\left[|\sum_{l\neq k} H_{i,:}[k]H^H_{:,l}[k]|^2\right] \quad \text{[Equation 18]}$$

$$M_{min} \cdot E\left[|\sum_{l\neq k} H_{i,:}[k]H^H_{:,l}[k]|^2\right] \leq \quad \text{[Equation 19]}$$

$$E[|D[k]|^2] \leq M_{max} \cdot E\left[|\sum_{l\neq k} H_{i,:}[k]H^H_{:,l}[k]|^2\right]$$

Here, $M_{min}$ and $M_{max}$ denote a setting variable controlled by a system designer. For example, $M_{min}$ may be set to be great enough to enhance the energy efficiency of the MIMO communication system, and $M_{max}$ may be set to be small enough to satisfy an error vector magnitude (EVM) required.

A power $D^2$ of the clipping distortion denotes a function of $v$, and $v$ may be determined by Equation 20.

$$v \to f^{-1}\left(\Xi \cdot E\left[|\sum_{l\neq k} H_{i,:}[k]H^H_{:,l}[k]|^2\right]\right) \quad \text{[Equation 20]}$$

The apparatus 210 for reducing the PAPR may determine a size of a constant $\Xi$, based on the energy efficiency of the MIMO communication system and the clipping distortion. The apparatus 210 for reducing the PAPR may set $\Xi$ to be great in order to further enhance the energy efficiency of the MIMO communication system, and set $\Xi$ to be small in order to further reduce the clipping distortion.

Figure 3:
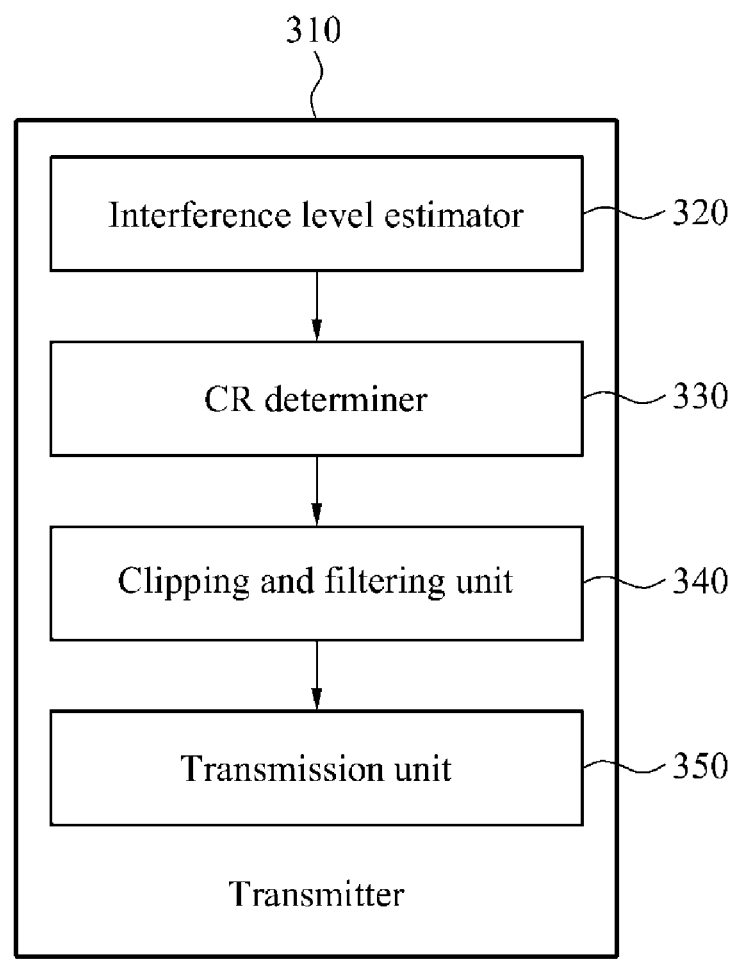
FIG. 3 is a diagram illustrating an example of a detailed configuration of a transmitter.

FIG. 3 illustrates an example of a detailed configuration of a transmitter 310. Referring to FIG. 3, the transmitter 310 may include an interference level estimator 320, a CR determiner 330, a clipping and filtering unit 340, and a transmission unit 350.

The interference level estimator 320 may estimate an interference level in a communication channel between the transmitter 310 and a user terminal. For example, the interference level estimator 320 may estimate IUI, inter-cell interference, ICI, and the like. The interference level estimator 320 may estimate the interference level in the communication channel, based on a precoding scheme of an MIMO communication system. For example, the interference level estimator 320 may estimate the interference level of IUI, based on a cross correlation level of a channel when the MIMO communication system uses MF precoding. The above description of interference level estimator 230 is also applicable to the analogous features of interference level estimator 320, and is incorporated herein by reference.

The transmitter 310 may further include a channel estimator (not shown) for estimating a communication channel between the transmitter 310 and the user terminal, based on channel information. The interference level estimator 320 may estimate the interference level, based on the communication channel estimated by the channel estimator.

The CR determiner 330 may determine a CR to be applied to an OFDM signal, based on the interference level. The CR determiner 330 may determine a CR that reduces a power of a clipping distortion to be less than a power of an interference level. The CR determiner 330 may adaptively determine a CR, based on conditions of a channel. The CR determiner 330 may determine a CR, based on at least one of an IUI level, an inter-cell interference level, or an ICI level. The above description of CR determiner 240 is also applicable to the analogous features of CR determiner 330 of FIG. 3, and is incorporated herein by reference.

The clipping and filtering unit 340 may clip an OFDM signal based on a CR, and filter the clipped OFDM signal to reduce spectrum erosion toward an adjacent channel. The clipping and filtering unit 340 may perform repeated clipping and filtering on the OFDM signal, within a predetermined range. The clipping and filtering unit 340 may determine a number of times the clipping and filtering is to be repeated, based on complexity and a time delay.

The transmission unit 350 may transmit the clipped and filtered OFDM signal to the user terminal. The transmission unit 350 may adaptively determine a number of transmission antennas to be applied, based on the number of user terminals.

Figure 4:
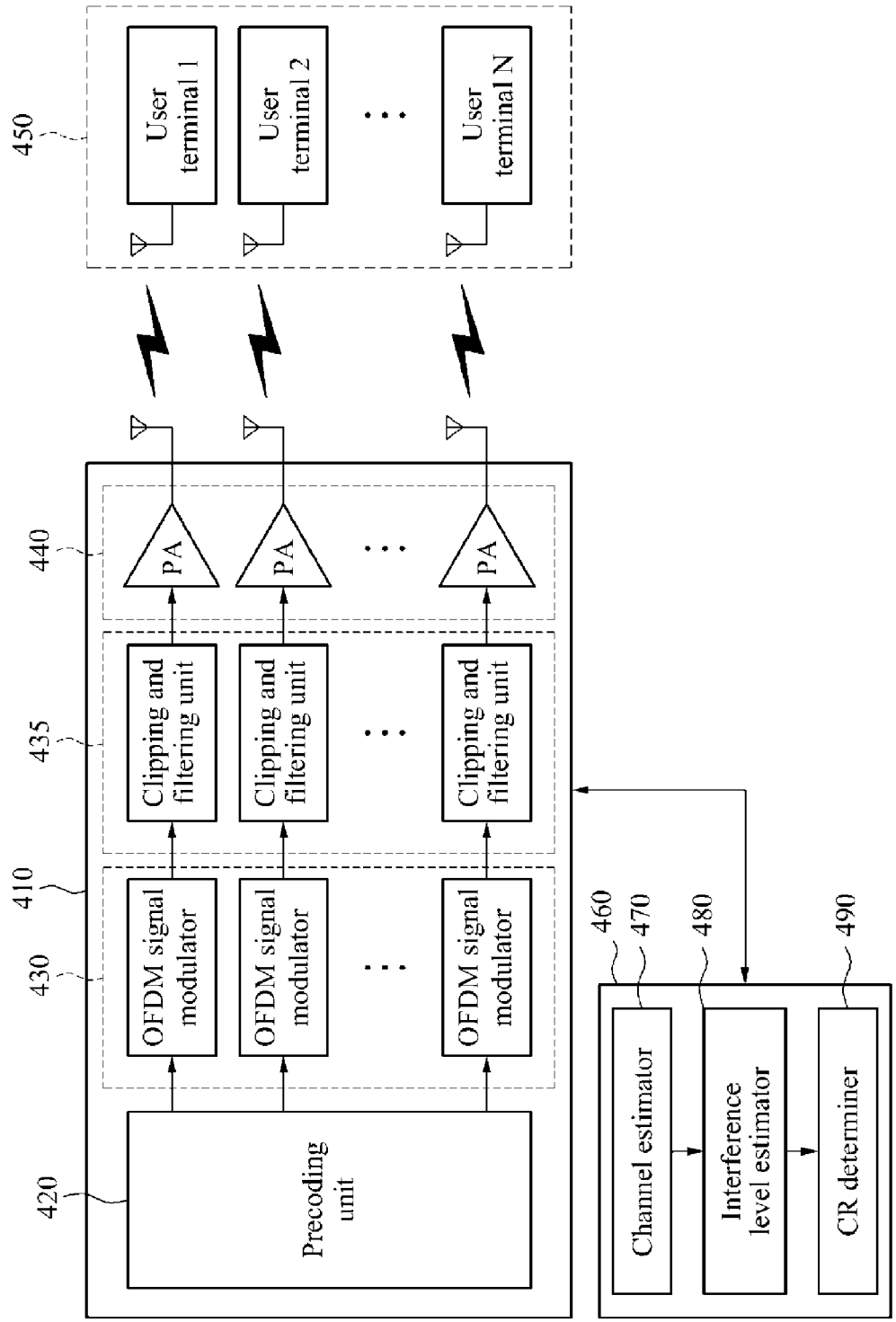
FIGS. 4 and 5 are diagrams illustrating examples of an operation of an MIMO-OFDM communication system.
Figure 5:
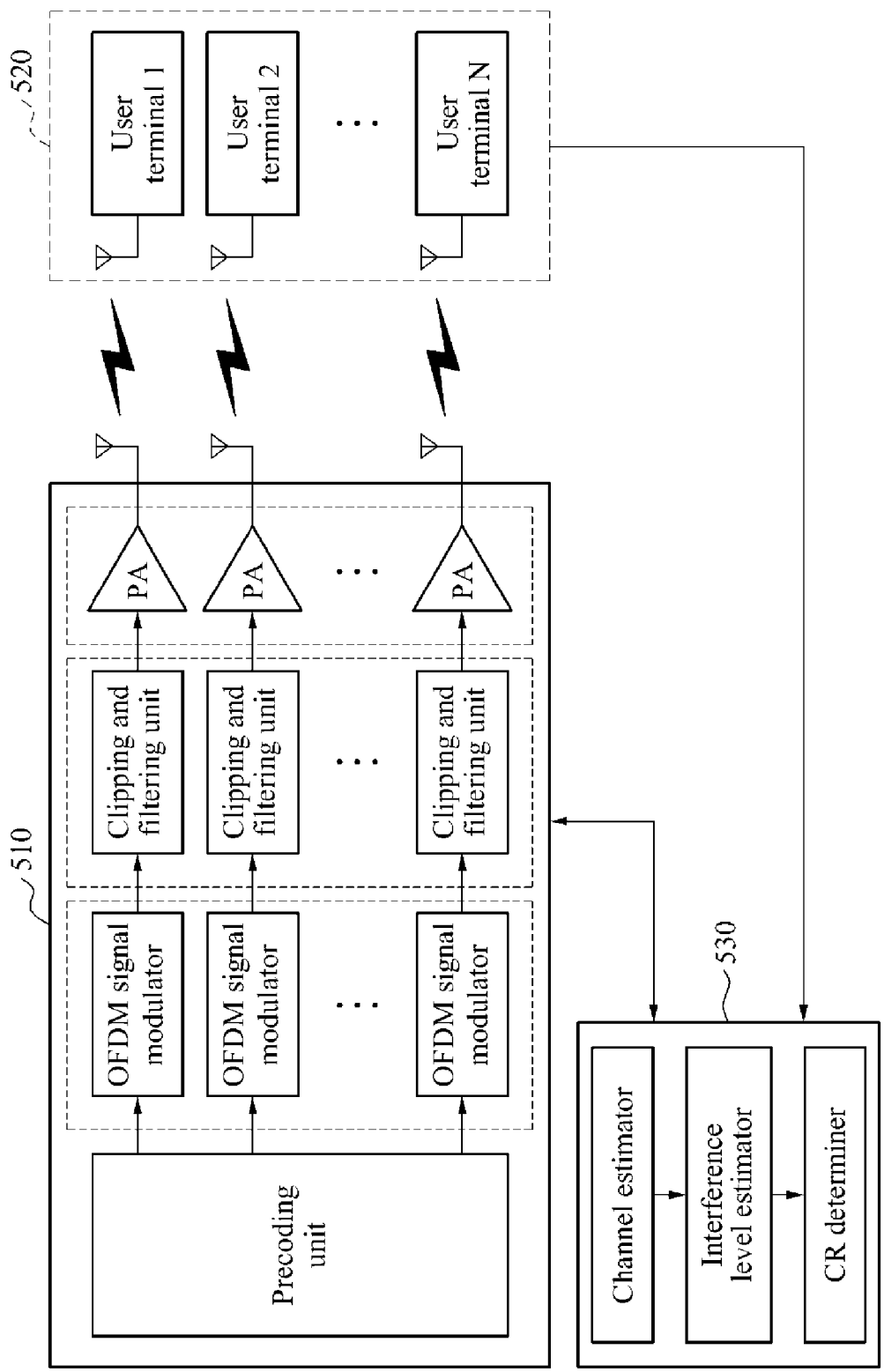

FIGS. 4 and 5 illustrate examples of an operation of an MIMO-OFDM communication system. In particular, FIG. 4 illustrates a transmitter 410, an apparatus 460 for reducing a PAPR, and user terminals 450 for a non-exhaustive example in which an MIMO communication system uses a TDD scheme. The above description of apparatus 210 for reducing a PAPR is also applicable to the analogous features of apparatus 460 for reducing a PAPR of FIG. 4, and is incorporated herein by reference. Likewise, the above description of transmitter 310 is also applicable to the analogous features of transmitter 410 of FIG. 4, and is incorporated herein by reference. Thus, the above description may not be repeated here. The transmitter 410 may include a precoding unit 420 to map a signal to be transmitted to a transmission antenna. The transmitter 410 may include an OFDM signal modulator 430 to perform OFDM modulation with respect to an input signal, a clipping and filtering unit 435 to clip and filter an OFDM signal, and a PA 440 to transmit the OFDM signal to the user terminal 450.

A channel estimator 470 of the apparatus 460 for reducing the PAPR may identify channel information through an uplink pilot signal of the user terminal 450 and channel sounding, and the channel estimator 470 may estimate a communication channel between the transmitter 410 and the user terminal 450. An interference level estimator 480 may identify a precoding scheme of the transmitter 410 to determine whether the transmitter 410 is a communication system that may be used for interference. The interference level estimator 480 may omit a process of identifying the precoding scheme when the precoding scheme of the communication system is fixed in a single precoding scheme. The interference level estimator 480 may estimate an interference level on the communication channel, and estimate an interference level of IUI when the precoding scheme corresponds to MF precoding. The interference level estimator 480 may estimate an interference level of the inter-cell interference, the ICI, and the like, when the precoding scheme does not correspond to the MR precoding. A CR determiner 490 may determine a CR applied in a clipping process of the OFDM signal, based on the interference level estimated. The CR determiner 490 may determine a CR appropriate for the communication system, based on a conflicting relationship between energy efficiency of the PA 440 and a clipping distortion of the OFDM signal. When the CR is determined, the clipping and filtering unit 435 may clip the OFDM signal based on the determined CR and filter the clipped OFDM signal. The clipped and filtered OFDM signal may be transmitted to the user terminal 450, via the PA 440.

FIG. 5 illustrates a transmitter 510, an apparatus 530 for reducing a PAPR, and a user terminal 520 for a non-exhaustive example in which a MIMO communication system uses an FDD scheme. In the FDD scheme, the apparatus 530 for reducing the PAPR may estimate a communication channel between the transmitter 510 and the user terminal 520, using channel information feedback from the user terminal 520. Other operations aside from the estimating of the communication channel may be identical to the operation of the MIMO communication system described in FIG. 4. Accordingly, the above description of FIG. 4 is incorporated herein by reference, and the above description may not be repeated here.

Figure 6:
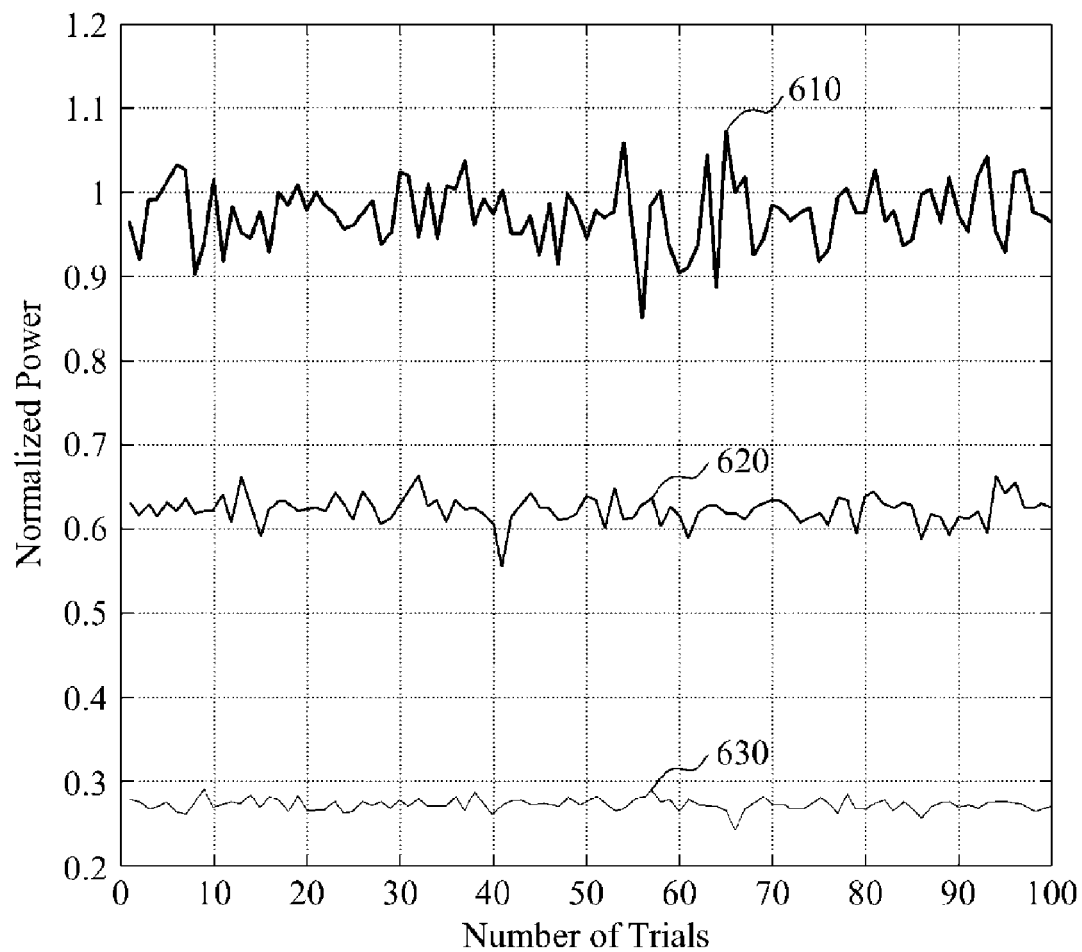
FIG. 6 is a diagram illustrating examples of a process of determining a clipping ratio (CR).

FIG. 6 illustrates examples of a process of determining a CR. In particular, when a number of transmission antennas of a transmitter is assumed to be "Nt=400", and a number of user terminals is assumed to be "K=40", FIG. 6 illustrates interference and a clipping distortion in a normalized power level with respect to a number of trials. A curve 610 illustrates an interference level of IUI. A curve 620 illustrates a clipping distortion level when a CR (v) is "3," and a curve 630 illustrates a clipping distortion level when a CR (v) is "4". The plurality of graphs 610 through 630 of FIG. 6 may represent that the higher a value of CR (v) the lower an effect of a clipping distortion, and that the clipping distortion may affect an overall performance of a system when a value of CR (v) is less than "3".

Figure 7:
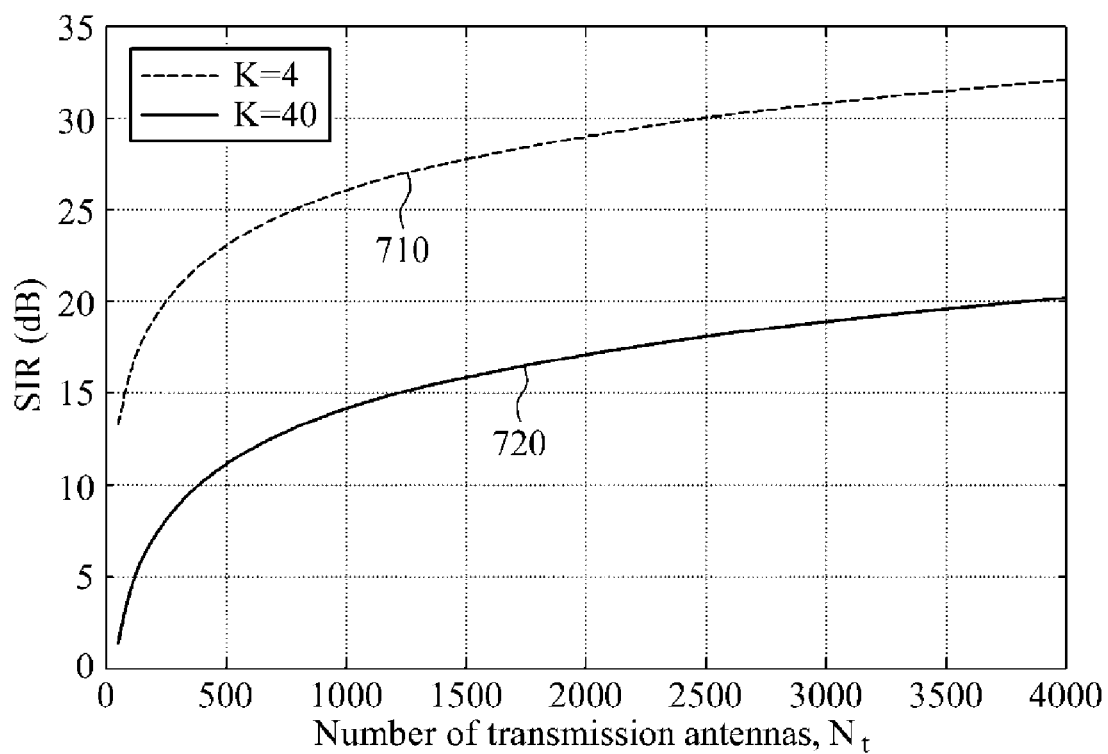
FIG. 7 is a diagram illustrating examples of a signal to interference ratio (SIR) with respect to a number of transmission antennas.
Figure 8:
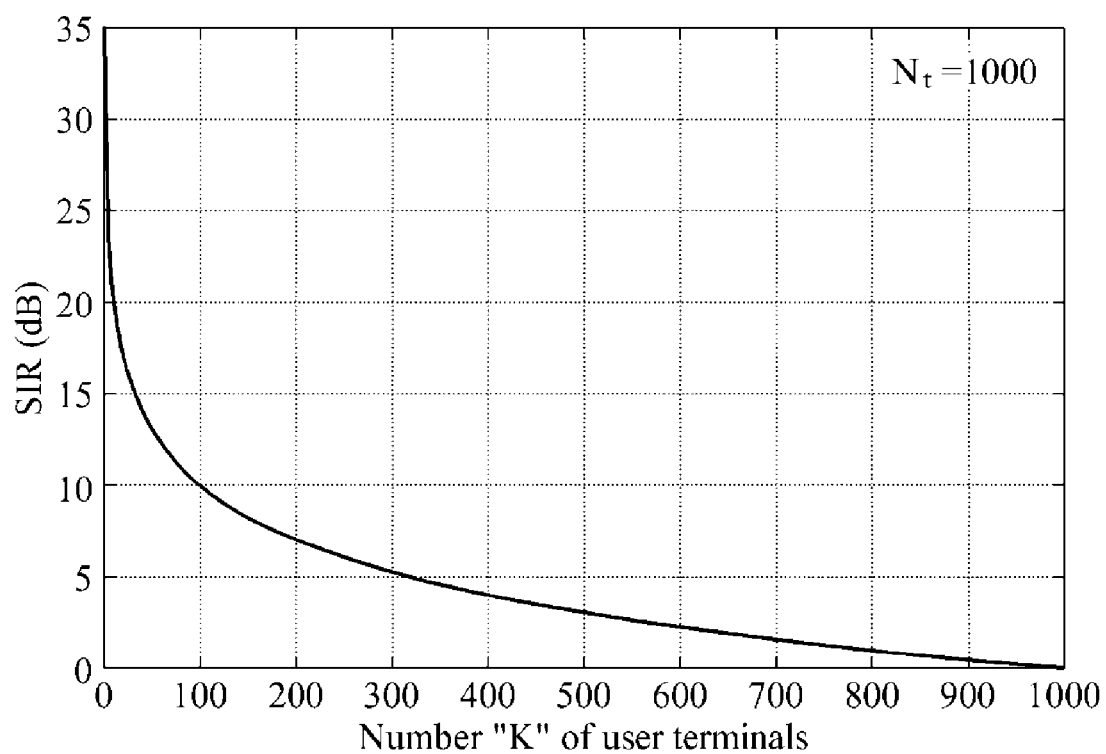
FIG. 8 is a diagram illustrating an example of an SIR with respect to a number of user terminals.

FIG. 7 illustrates examples of a signal to interference ratio (SIR) with respect to an Nt number of transmission antennas when MF precoding is assumed to be performed. A curve 710 illustrates an SIR when a K number of user terminals is "4", and a curve 720 illustrates an SIR when the K number of user terminals is "40". The curves 710 and 720 also illustrate that an interference level may change based on a number of transmission antennas or the number of user terminals. FIG. 8 illustrates an example of an SIR with respect to a K number of user terminals when an Nt number of transmission antennas is "1000". A curve of FIG. 8 illustrates that an interference level may vary as the number of user terminals changes. An apparatus for reducing a PAPR may estimate an interference level that varies based on a parameter, such as conditions of a channel, a number of transmission antennas, a number of user terminals, and the like, and determine a CR, based on the estimated interference level. The apparatus for reducing the PAPR may adaptively change the CR by reflecting the change of the parameter in real time.

Figure 9:
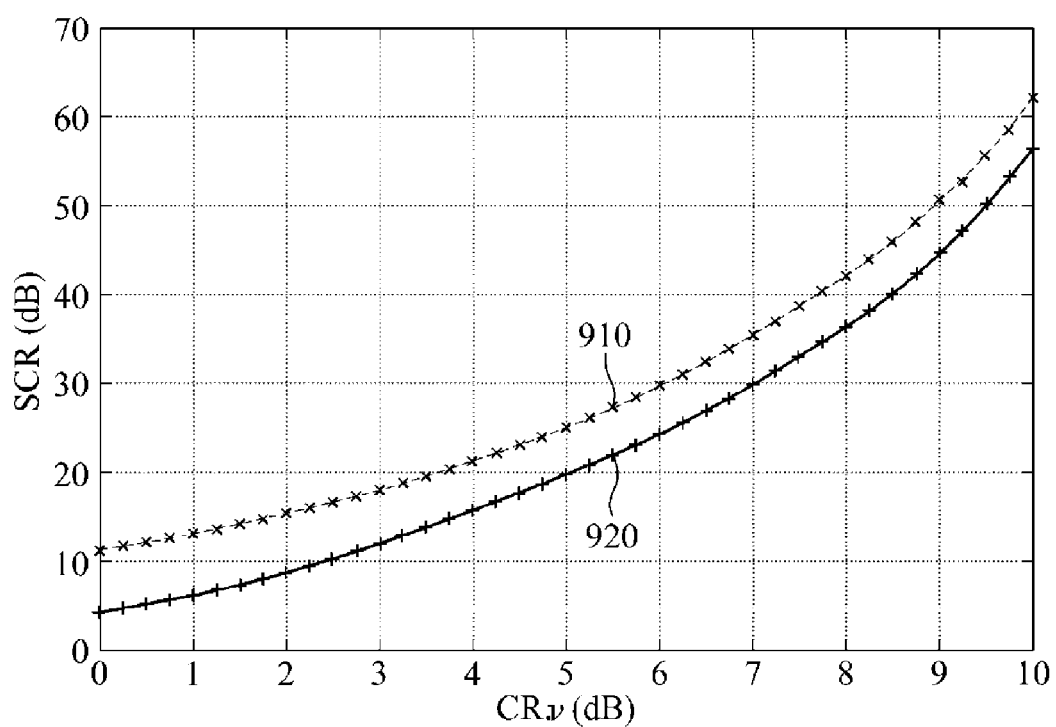
FIG. 9 is a diagram illustrating examples of a signal to clipping distortion ration (SCR) with respect to a clipping ratio (CR).
Figure 10:
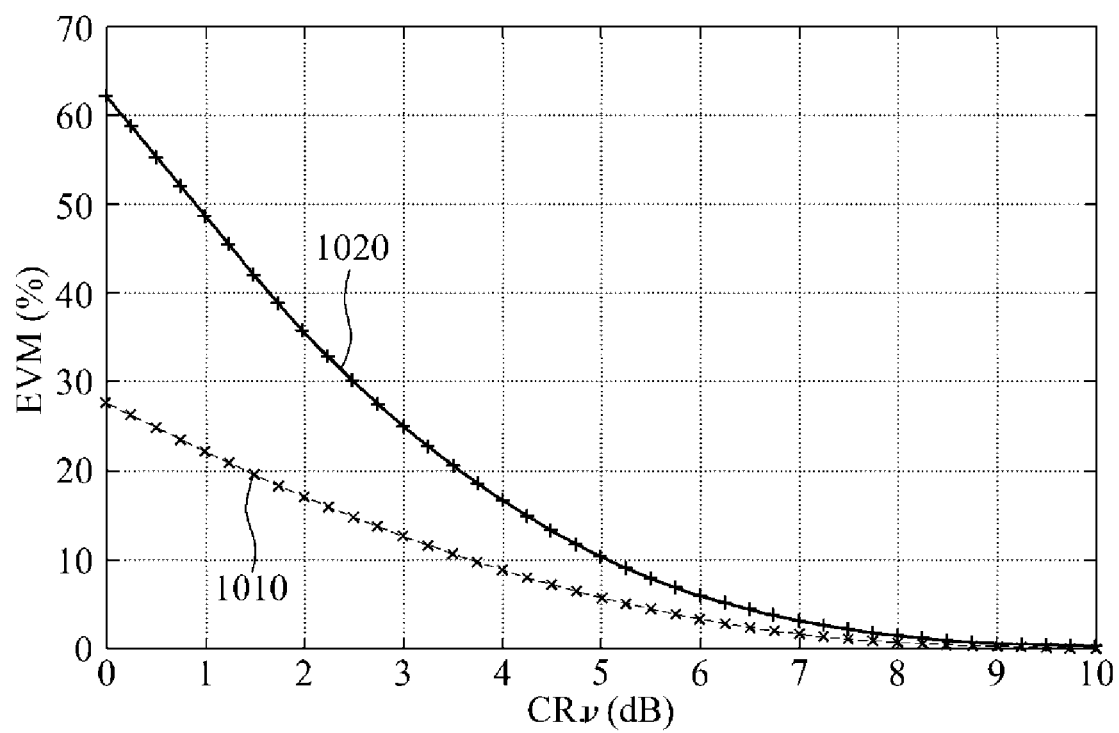
FIG. 10 is a diagram illustrating examples of an error vector magnitude (EVM) with respect to a CR.

FIG. 9 illustrates examples of a signal to clipping distortion ratio (SCR) with respect to a CR when MR precoding is assumed to be performed. A curve 910 illustrates an SCR when clipping and filtering is not performed repeatedly. A curve 920 illustrates an SCR when the clipping and filtering is performed five times repeatedly. FIG. 10 illustrates examples of an EVM with respect to a CR (v) when MF precoding is assumed to be performed. A curve 1010 illustrates an SCR when clipping and filtering is not performed repeatedly, and a curve 1020 illustrates an SCR when the clipping and filtering is performed five times repeatedly. For example, in an instance in which a number of transmission antennas is 10 times greater than a number of user terminals, when the CR is in an approximate range of 3 decibels (dB) to 4 dB, the CR (v) may enhance energy efficiency without affecting a performance of a system.

Figure 11:
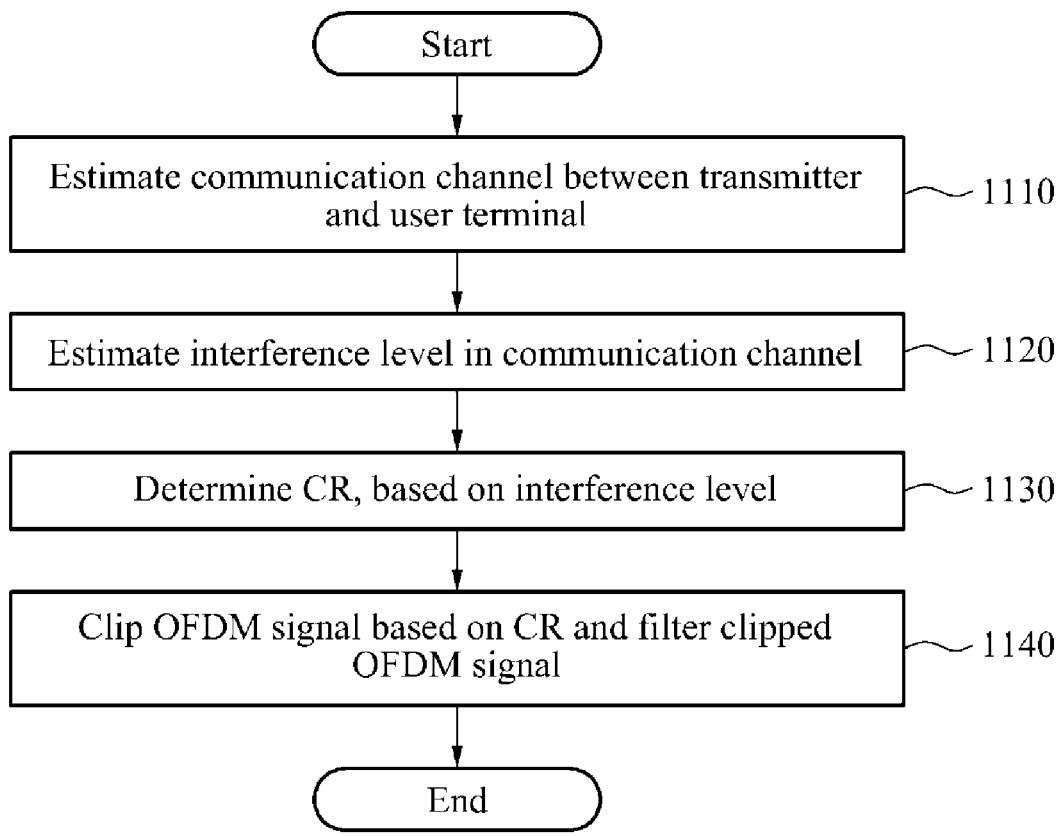
FIG. 11 is a diagram illustrating an example of a method for reducing a PAPR of an OFDM signal.

FIG. 11 illustrates an example of a method for reducing a PAPR of an OFDM signal. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. The above descriptions of FIGS. 1-10 with respect to an apparatus for reducing a PAPR ultrasound and transmitter is also applicable to FIG. 11, and is incorporated herein by reference. Thus, the above description may not be repeated here.

In 1110, a transmitter may estimate a communication channel between the transmitter and a user terminal in an MIMO communication system. The transmitter may estimate the communication channel through identifying channel information via an uplink pilot signal, channel sounding, and the like, when the MIMO communication system uses a TDD scheme. The transmitter may estimate the communication channel between the transmitter and the user terminal, using the channel information provided by the user terminal when the MIMO communication system uses an FDD scheme.

In 1120, the transmitter may estimate an interference level in the communication channel. The transmitter may identify a precoding scheme of the MIMO communication system, and determine whether use of the MIMO communication system for interference is possible. For example, when the MIMO communication system performs precoding, using an MF, the transmitter may estimate the interference level through estimating a cross correlation level of a channel. The transmitter may estimate the interference level, based on a system parameter including at least one of a number of transmission antennas, a number of user terminals, or a communication bandwidth. Also, the transmitter may estimate interference, such as IUI, inter-cell interference, ICI, and the like.

In 1130, the transmitter may determine a CR, based on the estimated interference level. The transmitter may determine a CR that reduces a power of a clipping distortion to be less than a power of an interference level. The transmitter may determine a CR, based on an energy efficiency of the MIMO communication system and the clipping distortion. For example, the transmitter may increase a CR of an OFDM signal when energy efficiency of a PA takes precedence over the clipping distortion of the OFDM signal. The transmitter may determine a CR, based on a least one of an IUI level, an inter-cell interference level, and an ICI level. Alternatively, the transmitter may determine a CR, based on a result of calculating a sum of the IUI level, the inter-cell interference level, and the ICI level. The transmitter may adaptively determine a CR, based on a system parameter including at least one of the number of transmission antennas, the number of user terminals, or the communication bandwidth. The transmitter may determine a CR, based on the energy efficiency of the MIMO communication system and an EVM.

In 1140, the transmitter may clip the OFDM signal, based on the CR, and filter the clipped OFDM signal. The transmitter may clip and filter the OFDM signal repeatedly within a predetermined range. The transmitter may determine a number of performing the clipping and filtering, based on complexity, a time delay, and the like. The transmitter may transmit the clipped and filtered OFDM signal to a user terminal.

Figure 12:
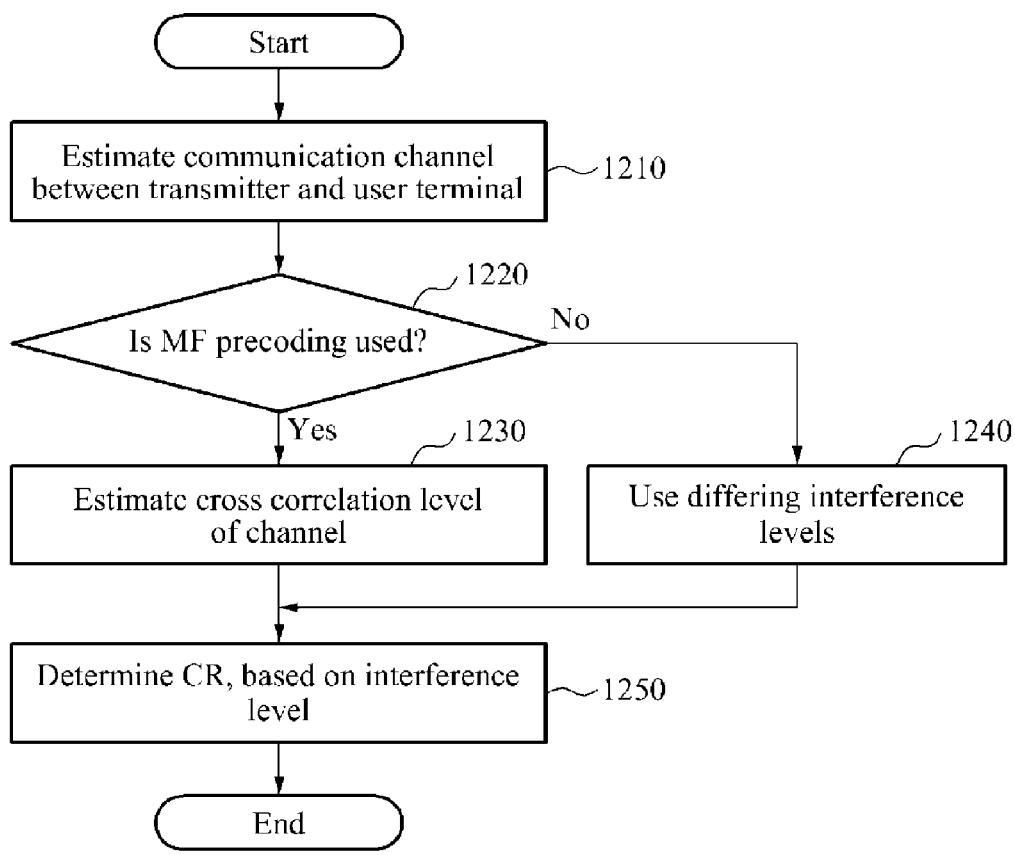
FIG. 12 is a diagram illustrating another example of a method for reducing a PAPR of an OFDM signal.

FIG. 12 illustrates another example of a method for reducing a PAPR of an OFDM signal. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. The above descriptions of FIGS. 1-11 with respect to an apparatus for reducing a PAPR ultrasound and transmitter is also applicable to FIG. 12, and is incorporated herein by reference. Thus, the above description may not be repeated here.

In 1210, an apparatus for reducing a PAPR may estimate a communication channel between a transmitter and a user terminal in an MIMO communication system. The description of 1110 in FIG. 11 is also applicable to the operation of 1210 of FIG. 12, and is incorporated herein by reference.

In 1220, the apparatus for reducing the PAPR may identify a precoding scheme of the MIMO communication system. When the MIMO communication system uses MF precoding, the apparatus for reducing the PAPR may estimate an interference level of a communication channel through estimating a cross correlation level of a channel in 1230. When the MIMO communication system does not use the MF precoding, the apparatus for reducing the PAPR may estimate the interference level of the communication channel, based on an inter-cell interference level, an ICI level, and the like.

In 1250, the apparatus for reducing the PAPR may determine a CR, based on the estimated interference level. The description of 1130 in FIG. 11 is also applicable to the operation of 1250 of FIG. 12, and is incorporated herein by reference.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for reducing a peak-to-average power ratio (PAPR) of an orthogonal frequency division multiplexing (OFDM) signal in a multiple-input multiple-output (MIMO) communication system, the method comprising:
   estimating an interference level in a communication channel between a transmitter and a user terminal;
   determining a clipping ratio (CR), based on the estimated interference level;
   clipping the OFDM signal based on the determined CR; and
   filtering the clipped OFDM signal,
      wherein the estimating of the interference level comprises:
      estimating a cross correlation level of the communication channel in response to the MIMO communication system performing a matched filter (MF) precoding;

determining the interference level based on the estimated cross correlation level,
wherein the interference level comprises an inter-user interference (IUI) level.

2. The method of claim 1, wherein the determining of the CR comprises determining the CR to reduce a power of a clipping distortion to be less than a power of the interference level.

3. The method of claim 1, wherein the determining of the CR comprises determining the CR based on at least one of an inter-cell interference level, an inter-carrier interference (ICI) level, an inter-user interference (IUI) level, or a result of calculating a sum of the IUI level, the inter-cell interference level, and the ICI level.

4. The method of claim 1, wherein the determining of the CR comprises determining the CR based on at least one of a number of transmission antennas, a number of user terminals, or a communication bandwidth.

5. The method of claim 1, wherein the estimating of the interference level comprises estimating at least one of an inter-carrier interference (ICI) or inter-cell interference in response to the MIMO communication system not performing the MF precoding.

6. The method of claim 1, wherein the determining of the CR comprises:
determining the CR, based on an energy efficiency and an error vector magnitude (EVM) of the MIMO communication system.

7. The method of claim 1, wherein the clipping and the filtering of the OFDM signal comprises clipping and filtering the OFDM signal repeatedly in a predetermined range.

8. The method of claim 1, further comprising estimating a communication channel between a transmitter and a user terminal for configuring the MIMO communication system.

9. The method of claim 1, wherein the estimating of the interference level comprises determining the interference level based on at least one of a number of transmission antennas, a number of user terminals, or a communication bandwidth.

10. A multiple-input multiple-output (MIMO) apparatus comprising:
an interference level estimator configured to estimate an interference level in a communication channel between a transmitter and a user terminal;
a clipping ratio (CR) determiner configured to determine a CR to be applied to an orthogonal frequency division multiplexing (OFDM) signal, based on the interference level; and
a clipper and a filter configured to clip the OFDM signal based on the CR and filter the clipped OFDM signal,
wherein the transmitter is configured to transmit the clipped and filtered OFDM signal to the user terminal, and
wherein the interference level estimator estimates the interference level by
estimating a cross correlation level of the communication channel in response to the MIMO communication system performing a matched filter (MF) precoding; and
determining the interference level based on the estimated cross correlation level,
wherein the interference level comprises an inter-user interference (IUI) level.

11. The apparatus of claim 10, wherein the CR determiner is configured to determine the CR, based on at least one of an inter-user interference (IUI) level, an inter-cell interference level, an inter-carrier interference (ICI) level, or a result of calculating a sum of the IUI level, the inter-cell interference level, and the ICI level.

12. An apparatus for reducing a peak-to-average power ratio (PAPR) of an orthogonal frequency division multiplexing (OFDM) signal, the apparatus comprising:
a channel estimator configured to estimate a communication channel between a transmitter and a user terminal in a multiple-input multiple-output (MIMO) communication system;
an interference level estimator configured to estimate an interference level in the MIMO communication channel; and
a clipping ratio (CR) determiner configured to determine a CR, based on the interference level, and to provide the determined CR to the transmitter,
wherein the transmitter is configured to transmit the clipped and filtered OFDM signal to the user terminal, and
wherein the interference level estimator estimates the interference level by
estimating a cross correlation level of the MIMO communication channel in response to the MIMO communication system performing a matched filter (MF) precoding; and
determining the interference level based on the estimated cross correlation level,
wherein the interference level comprises an inter-user interference (IUI) level.

13. The apparatus of claim 12, wherein the CR determiner is configured to determine the CR to reduce a power of a clipping distortion to be less than a power of the interference level.

14. The apparatus of claim 12, wherein the CR determiner is configured to determine the CR based on at least one of an inter-user interference (IUI) level, an inter-cell interference level, an inter-carrier interference (ICI) level, or a result of calculating a sum of the IUI level, the inter-cell interference level, and the ICI level.

15. The apparatus of claim 12, wherein the CR determiner is configured to determine the CR based on at least one of a number of transmission antennas, a number of user terminals, or a communication bandwidth.

16. The apparatus of claim 12, wherein the CR determiner is configured to determine the CR based on an energy efficiency and an error vector magnitude (EVM) of the MIMO communication system.

17. The apparatus of claim 12, wherein the channel estimator is configured to estimate the communication channel based on at least one of an uplink pilot signal provided by a terminal or a channel sounding.

18. The apparatus of claim 12, wherein the CR determiner is configured to:
increase the CR when energy efficiency of a power amplifier takes precedence over a clipping distortion; and
reduce the CR when maintaining an original signal takes precedence over the energy efficiency of the power amplifier.

* * * * *